UNITED STATES PATENT OFFICE.

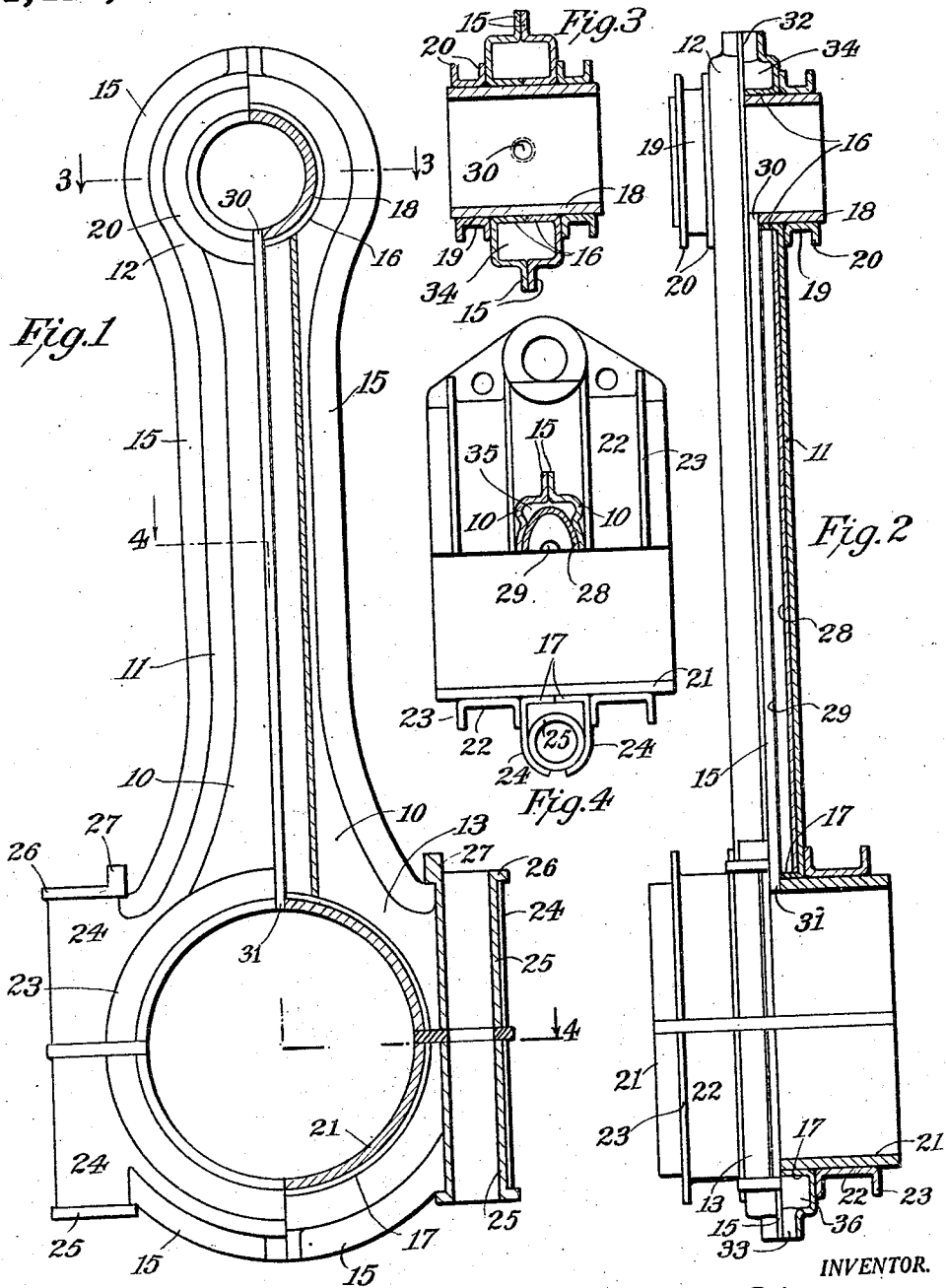

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING ROD.

1,418,084.  Specification of Letters Patent.  Patented May 30, 1922.

Application filed December 7, 1916. Serial No. 135,603.

*To all whom it may concern:*

Be it known that I, HEBRON BERNARD LAYMAN, a citizen of the United States, residing at New York, county and State of New York, have invented certain new and useful Improvements in Connecting Rods, of which the following is a full, clear, and exact description.

This invention relates to certain new and useful improvements in sheet metal connecting rods, and is particularly applicable to rods of the types disclosed in my co-pending applications, Serial Nos. 24481, filed April 28th, 1915, and 44438 filed Aug. 9th, 1915.

An object of the present invention is the cheapening of manufacture; another, the insuring of uniform weight; yet another, the incorporation of new structural advantages. Further objects will appear hereafter in the specification and claims.

By way of example in the drawings:

Fig. 1 shows a side elevation of a connecting rod embodying the invention. One half of the rod is shown in central section to show the construction.

Fig. 2 is a view at right angles to the view shown in Fig. 1, with one half of the rod in central section.

Fig. 3 is a sectional view, taken on line 3—3 of Fig. 1, and looking in the direction of the arrows.

Fig. 4 is a section, taken on line 4—4 of Fig. 1, and looking in the direction of the arrow.

In more detail, the rod shown here by way of example comprises two substantially similar parts of sheet metal 10, each part having a shank portion 11, a smaller or piston end portion 12, a larger or crank end portion 13. The two parts are stamped from sheet metal, and are provided with outwardly extending flanged portions 15, which extend substantially around the rod. These flanged portions of the parts are adapted to abut together, as shown in Figs. 3 and 4.

The piston and crank ends are provided with inwardly extending cuff portions 16 and 17, which also abut against each other at their ends when the two halves of the rod are placed together. The cuffs 16 when turned inward form a circular opening or aperture in the piston end of the rod. Within this aperture and in contact with the cuffs 16 is placed a sleeve bearing member 18, which as shown is of such length that it projects beyond the sides of the rod. These projecting portions of the sleeve bearing member receive collar-like members 19, having annular flanges 20 which serve to reinforce and strengthen the piston end of the rod, and together with the flanges 15, which surround the bearing, are adapted to radiate the heat generated therein.

At the crank end of the rod, the inwardly turned cuffs 17 are adapted to receive a sleeve like bearing member 21, similar to the sleeve bearing member 18 of the piston end of the rod. The sleeve lining 21 may be provided with a Babbitt metal bearing to cooperate with the crank pin. The sleeve bearing 21 receives collars 22 having annular flanges 23, which strengthen and radiate the heat at the crank end of the rod.

The crank end 13 is shaped as shown at 24 to form bolt boss portions within which are inserted tubular bolt receivers 25, having at one end a bolt-head seat 26, provided with a lip 27, to prevent the bolt from turning.

The shank portion of the rod is oval at the center. Inside and abutting against the oval part is an oval reinforcing member 28, which does not extend entirely to the inner edge of the shank, but is spaced therefrom, as shown in Fig. 4. The tubular reinforcing member is of such length that it abuts at its ends against the cuff portions 16 and 17. This member 28 both stiffens the shank of the rod, and the junctions of the shank and end portions as a part of the stress of the crank and piston pins is transmitted directly to the tubular reinforcing member.

The reinforcing of the shank portion of the sheet metal connection rod has been shown but not claimed generically in my co-pending application Serial No. 86,361, filed March 24, 1916.

Within the tubular reinforcing member is an oil pipe 29 which is adapted to lead oil from the crank pin to the piston pin bearing. The oil pipe is carried by the cuff portions 16 and 17, and the piston and crank bearing sleeves are drilled as shown at 30 and 31 to permit the oil to flow out of and into the oil-pipe.

After the two halves of the rod and the various sleeves, collars, interior reinforcing member, bolt boss, bolt receivers, have been assembled, the parts are superficially spot welded and then the rod is completely immersed in a molten alloy of metals at a temperature approximating or even exceeding the melting temperature of the metal in the rod to be welded. This process of immersion welding is described and claimed by me in my co-pending application, Serial No. 168,514, filed May 14th, 1917.

As the completed rod is hollow, it has been found that there is a tendency for superfluous quantities of spelter to accumulate within the rod. This is undesirable since different rods will have different weight, and the balance of the rods will be varying. I accordingly provide an aperture 32 at the top of the rod, and another aperture 33 at the lowermost part of the crank end portion, to permit the alloy to have free access to the interior of the rod, and at the same time provide means for draining all excess alloy from the interior of the rod. The space 34, within the upper end of the rod, space 35, in the shank portion, and space 36, at the bottom, provide a continuous passage so that any excess of alloy will drain out of the aperture 33 when the rods are being withdrawn from the molten metal.

After the rods have been welded, they are then "heat-treated". Thereafter the crank end of the rod is sawed transversely to form a cap or second part in the manner described in my previous application Serial No. 24,481.

It will be understood that my invention is susceptible of various modifications, as will occur to those skilled in the art. What I claim as my invention is more particularly pointed out in the appended claims.

I claim:

1. In a connecting rod, in combination, a plurality of abutting sheet metal parts having provisions for the ingress and egress of molten metal to and from the space between the abutting parts.

2. A connecting rod composed of two substantially similar abutting parts having provisions for the ingress and egress of molten metal to and from the interior of the rod, substantially as described.

3. A connecting rod composed of two substantially similar abutting parts, said parts each having a hollow shank portion and a smaller and larger end portion having apertures therein to permit the ingress of molten metal to the interior of the rod and the draining of excess metal therefrom.

4. A connecting rod composed of abutting sheet metal parts and having a hollow shank portion, means for reinforcing the said shank portion and provision for the ingress of molten metal to the interior of the shank portion and draining of excess metal therefrom.

5. In a connecting rod, in combination, a plurality of substantially similar parts having a shank portion, and a smaller and a larger end portion, said end portions having inwardly extending cuff portions forming apertures in the crank and piston pin ends of the rod.

6. In a connecting rod, in combination, a plurality of substantially similar parts having a shank portion and end portions, inwardly extending cuff portions at the end portions, and abutting flanged portions.

7. In a connecting rod, in combination, a plurality of substantially similar parts having a shank portion and end portions, said end portions having inwardly extending cuff portions, and sleeve bearing members therein to receive a piston pin and a crank pin.

8. In a connecting rod, in combination, a plurality of substantially similar parts having a shank portion and end portions and integral abutting flange portions, said end portions having inwardly extending cuff portions, and sleeve bearing members in the cuff portions.

9. In a connecting rod, in combination, a plurality of substantially similar flanged abutting parts, having a smaller and larger end portions, and a shank portion, said end portions having inwardly extending cuff portions, sleeve bearing members therein, and collar-like reinforcing members on said sleeve bearing portions.

10. In a connecting rod, in combination, a plurality of substantially similar abutting sheet metal parts having a shank portion and larger and smaller end portions; a reinforcing member therebetween in the region of the said shank portion, the end portions having inwardly extending cuffs, and sleeve-like members in the cuffs.

11. In a connecting rod, in combination, a plurality of flanged abutting sheet metal parts, having a shank portion and larger and smaller end portions, said larger end portion having integral bolt boss portions and inwardly directed cuff portions, a sleeve like member within the said cuff portions, and bolt receivers within the bolt boss portions.

12. A connecting rod having a plurality of abutting parts, each of said parts having a shank portion and smaller and larger end portions, and inwardly extending cuff portions upon the said end portions, and a reinforcing member within the shank portion and abutting at its end against the aforesaid cuff portions to stiffen the shank portion and the junctions of the shank and end portions.

13. A connecting rod composed of two substantially similar abutting parts having a hollow shank portion and abutting flange portions, a tubular reinforcing member within the shank portion united to said parts and cooperating with the united abutting flanges to hold the two parts together.

14. In a hollow built-up sheet metal connecting rod adapted to be brazed or welded by immersion in molten metal; provision for the ingress and egress of molten metal to and from the interior of the rod.

In testimony whereof I hereunto affix my signature.

HEBRON BERNARD LAYMAN.